Figure 1:
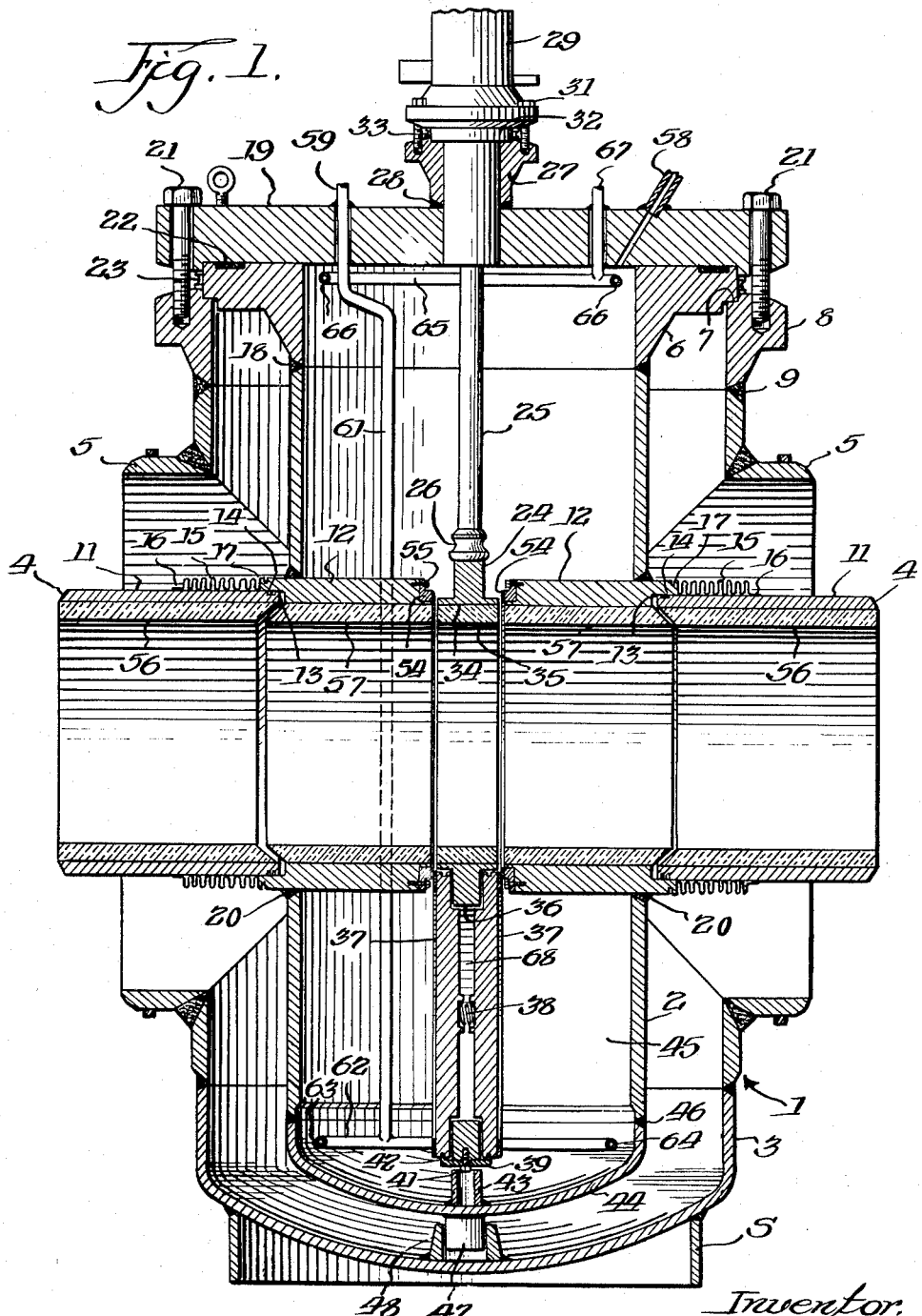

Jan. 26, 1965   J. A. McINERNEY   3,167,088
CONCENTRIC DUCT VALVE CONSTRUCTION
Filed May 9, 1962   2 Sheets-Sheet 1

Inventor.
John A. McInerney.
By Joseph O. Lange
Atty.

Jan. 26, 1965 J. A. McINERNEY 3,167,088
CONCENTRIC DUCT VALVE CONSTRUCTION
Filed May 9, 1962 2 Sheets-Sheet 2

Inventor:
John A. McInerney,
By Joseph O. Lange
Atty.

3,167,088
CONCENTRIC DUCT VALVE CONSTRUCTION
John A. McInerney, Evergreen Park, Ill., assignor to Crane Co., Chicago, Ill., a corporation of Illinois
Filed May 9, 1962, Ser. No. 193,421
3 Claims. (Cl. 137—375)

This invention relates generally to concentric duct or jacketed valves. More particularly, the invention is concerned with a particular type of the latter construction in which inner and outer valve bodies or casings are provided, so mounted relative to each other that temperature and pressure differences normally existing are avoided during start-up, normal operation and shut-down, thereby eliminating such stresses as radial, axial, and hoop.

At the outset, in order to have a better appreciation of the background of this invention, it should be understood that in connection with pipe lines where there are temperature and pressure differentials existing the valves for such lines must be so designed as to avoid the usual tie-in constructions, the latter being impractical because of the objectionable stresses created as above specifically mentioned.

Also in valves for such unusually severe services, for example, in such services involving temperatures of the order of 1500° F., and wherein valves are held to extremely high standards of performance and subject to inspection during fabrication, as well as radiography and testing, these requirements present unique problems. Specifically, valves of this general character are intended for use on helium gas lines in which the inner portion of the valve body or casing may be suitable for approximately 425 pounds per square inch pressure and 1500° F., the gas being handled being helium or the like, while the outer duct of the assembly, also suitable for the gas referred to, should be capable of service at about 450 pounds per square inch pressure at 600° F. In the latter connection, it should be understood as will hereinafter be more apparent the difference in pressure between the respective casings provides that the higher pressure in the outer duct or casing prevents any leakage from the inner duct or casing outwardly.

The mounting or tie-in between the respective casings must be such as to present unusual flexibility in the tie-in construction between the respective inner and outer valve bodies or casings in their normal assembly.

Therefore, another object of this invention is to provide for a jacketed type of valve construction, in which the arrangement for such jacketing permits of a relatively easy and economical fabrication, while at the same time it permits convenient radiography and testing of the valve assembly, preferably during the course of such assembly. Specifically, the respective ducts or casings as will hereinafter be apparent are capable of radiographic and other inspection prior to their tie-in assembly.

Therefore, it is one of the more important objects to provide what is termed in the art as a floating body construction in which the inner valve body and the outer valve body constitute separate units.

Another object of the invention is to provide for a jacketed valve in which a parallel disc conduit-type gate valve may be employed, either suitable for integral fluid driven piston actuation or hand operation.

Another object of this invention is to provide a construction in which such conduit type gate valves permit of the valve body run being bridged by a disc or closure member carrier with an insulation arrangement complementary to that employed by the valve casing.

A further object is to provide for a valve construction in which in the closed position a pair of separate circular spring loaded discs are positioned against the respective casing seat rings and are seated by means of fluid pressure acting between the disc when a suitable body pressurizing valve is opened.

It is a further object to provide for closure discs of a circular form in order to minimize distortion in the normal course of service.

A further object of this invention is to provide for a jacketed valve in which the inner valve of such assembly at its upper and lower portions is provided with suitable bleed piping conveniently arranged to cooperate with said upper and lower portions of the valve.

A further object is to provide for valve seat rings of a replaceable type, the latter being held in place by means of suitable bolts.

A further object is to provide for a valve in which the internal insulation is suitably mounted on the inside surface of the inner duct or body casing.

Another object is to provide for a valve construction in which the closure member guides may be suitably formed to increase the wear life of the guides by being easily or conveniently hard faced and preferably being held in a dove-tail slot in the inner body to permit convenient replacement.

Another important object of the guide construction referred to is to permit of such guides being suspended from an upper ledge portion of the valve body, thereby to overcome the otherwise objectionable effects arising from thermal expansion or contraction and seriously interfering with the usual or normal valve guide assembly.

Figure 2:
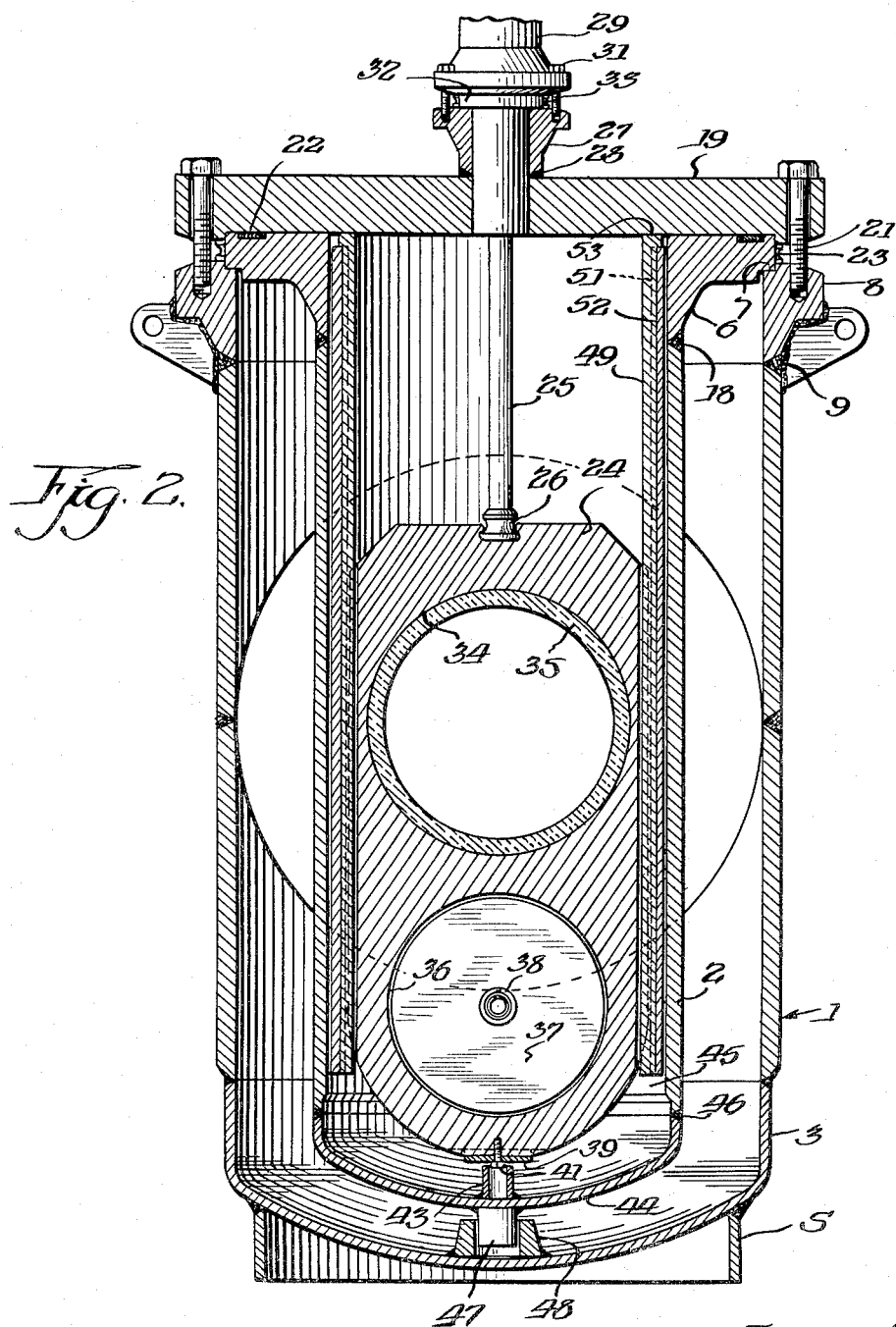

Other objects and advantages will become more readily apparent upon proceeding with the specification read in light of the accompanying drawings in which:

FIG. 1 is a sectional assembly view of a jacketed and multiple duct valve body embodying my invention; and FIG. 2 is a transverse sectional view taken at right angles to FIG. 1.

Similar reference numerals refer to similar parts throughout the several views.

Referring now to FIG. 1, the valve casing generally designated 1 consists of the inner or enclosed housing 2 and the outer or jacketing housing 3. The inner housing 2 is provided as at 4 with suitable pipe connecting means and for the same purpose the outer casing 3 is provided at its outer end limits with the connections 5 for attachment to the larger pipe overlying or telescoping the inner pipe defined by the end limits 4. In this construction, the inner valve housing is provided at its top portion with an end flange 6 received as at 7 within the flange 8 weldconnected as at 9 to the outer casing 3. Thus, it will be apparent that the inner valve casing 2 is actually suspended within the outer casing 3. Because of the nature of the mounting with the flange 8 it is, therefore, not subject to the objectionable thermal and pressure stresses normally resulting in distortion between the inner body 2 and the outer body 3. This structural arrangement in supporting the inner body 2 also provides for a more uniform temperature distribution for each body, particularly insofar as the inner valve body 2 is concerned. In connection with promoting desirable flexibility in the mounting, a further step in this direction has been taken by means of the mounting of the tubular tailpiece members 11, the latter elements being slidably received within the tubular seat retaining members 12 as at 13 to allow for a limited amount of axial movement and preferably providing a sealing means by means of the metal piston rings 14. The slight but desirable axial flexibility referred to is improved from a fluid sealing standpoint in addition to the piston rings by means of the bellows 15, the latter being attached as at 16 and 17 respectively to the members 11 and 12. Thus, it will be understood that stresses or strains placed upon the inner casing 2 to a large degree will be minimized by the effectiveness of the axial adjustment in positioning the pipe connecting ends 11 relative to the seat retaining members 12. At the upper portion of the inner casing 2, the flange 6 weld-attached to the casing as at 18 serves as the basis for receiving the bonnet 19 for the bonnet outer housing 3. The outer housing bonnet 19 is attached by suitable bolt studs 21 to the flange 8 as indicated. Suitable fluid sealing means are provided as indicated by gasket 22 and the seal weld member 23.

For the purpose of actuating the valve disc carrier 24, a stem 25 is employed having at its innermost or lower limits a stem T-head 26, the stem being reciprocally or axially movable to open or close the valve in the course of service.

On the upper portion of the bonnet 19, a suitable guide member 27 is weld attached as at 28 having at the upper portion of the latter member an actuating adapter means 29 secured to the guide member 27 by means of the bolt studs 31 and being retained thereon by means of the flange or collar 32 and with a weld seal as indicated at 33. Depending upon the nature of the service, the adapter 29 may be of any suitable form to accommodate a handwheel, fluid motor cylinder or an electric operator.

The lower portion of the stem 25 carries the disc carrier 24, the latter being apertured as at 34 to receive the insulation lining 35. The carrier is also apertured in a lower portion thereof as at 36 to receive in shouldered relation thereto the oppositely disposed discs 37. The latter members are maintained in a spaced-apart relationship by an interposed coiled spring 38. The carrier 24 at its lower portion is provided with the retaining clamp plate 39 attached by means of the cap screw 41 to said carrier member and retaining the discs in position by the inwardly turned flange portions as at 42, as more clearly shown in FIG. 2. The bumper or stop 43 for the closure member in the valve open position is provided on the inner lower wall of the housing cap 44, which defines the lower limits of the valve chamber 45 and is welded to the inner housing at 46. On the outer portion of the cap 44, a casing pilot or location member 47 is provided relatively closely received within the sleeve 48, the function of said portion 47 being to restrain the inner valve housing or casing against any substantial lateral movement with respect to the outer housing 3.

The disc carrier 24 is guided in the inner housing 2 by means of the removable guide strip 49, the latter member being received to slide within the groove portion 51 of the guide carrier 52. In order to provide against axial movement the bonnet 19 bears against the outwardly hooked portion 53 to hold the guide 49 at its upper end portion in position as indicated, and thereby permitting the opposite end of the said guide to expand or contract in ready response to changes in temperature conditions without binding, or otherwise objectionably interfering with the operation of the valve.

It will be noted that the seat ring retaining members 12 at their innermost end portions are provided with the annular seat rings 54, the said seat rings being attached to the said retaining members by means of the annularly disposed cap screws 55.

A valve stand S of substantially cylindrical form serves as a support for the combined casings when the latter are assembled.

It will be appreciated that in connection with the widely differing types of fluids and frequently carrying different pressures and temperatures within the respective inner and outer casings, it is desirable to provide that suitable insulation be arranged therewithin to supplement the insulation 35 in the carrier 24. Specifically, the casing annular members 11 and 12 as at 56 and 57 are provided with cylindrical insulating members thereby to provide a continuous streamlined or straight-through flow for the closure member when the valve is in the open position as illustrated.

Also in connection with considering the contrasting temperatures and/or pressure conditions within the respective housing 2 and 3, it is frequently desirable to effectively bleed the line fluids as well as to apply positive pressure on occasions to the valve interiors.

Specifically, attention is directed to the positive means for supplying line fluids to the interior of the inner valve housing as indicated at the feed or supply means 58 which may be connected to any suitable source of fluid supply (not shown).

As to the fluid bleed mechanism employed, it should be noted that a suitable connection is made as at 59 connected to a similar source of fluid supply (not shown) and entering the conduit 61. Fluid exits are provided in the member 62 as at 63 and 64 when the lower chamber 45 of the inner valve housing is filled and this serving to cooperate with the upper bleed conduit 65 and the inlet or outlet opening 66, depending upon the nature of the service for which the valve is installed. Fluid entry or exhausting selectively may take place at 67. In this way, a complete circuit for the bleed mechanism is available. Of course it will also be appreciated in this connection that by means of the positive pressure from fluid entering the valve chamber 45 the space 68 between the discs 37 may also be supplied with fluid pressure sufficient to aid the spring 38 and thus maintain the said discs in spaced-apart relation when the valve is in the closed position as distinguished from that illustrated.

In connection with the manner of making the assembly of the hollow casings 2 and 3 in the manner illustrated, it will be appreciated that both the inner and outer casings are independently fabricated to the extent that stress relieving and subsequent machining is completed in each casing before the assembly illustrated in FIG. 1 is finally made. The independent assembly referred to includes the mounting of the seat rings in the inner housing before the latter member is inserted into the outer housing. The inner housing is mounted by means of the attached flange 6 to rest upon the annular ledge or shoulder 7 of the flange 8 of the outside housing. Upon the completion of such assembly of the casings and attaching the guide means to the inner housing the carrier 24 is attached to the stem as at the T-head 26. With this assembly complete the bonnet 19 is next moved axially over the stem 25 and is bolted in position as illustrated. Subsequently the welding connections with the respective fluid supply means at 58, 59, and 67, are completed as illustrated.

The next step in the novel valve assembly is that the seat retaining members 12 are introduced through the apertures defined by the subsequently applied welds 20 and assuming the position as illustrated. The latter steps also include initial welding of the bellows 15 to the members at 16 before the latter members are placed in a position shown. Finally the outer annular ends of bellows 15 as at 17 are attached in a fluid sealing manner to the seat retaining members thereby to complete the assembly of the respective valve housings.

Thus, a comparatively flexible, jacketed assembly of valve casings has been provided possessing unusual durability and assembled easily with the plurality of conduits or ducts.

While only a single embodiment has been disclosed and described herein, it should be apparent that the manner of exemplifying my invention is capable of being set forth in numerous other modifications falling within the spirit of this invention. It is the desire therefore to be limited only to the extent of the claims appended hereto interpreted in light of such limitations as may be imposed by the state of the art.

I claim:
1. In a substantially concentric duct gate valve;
   the combination including two hollow casings;
   one of said casings enclosing the other casing in spaced apart relation thereto;
   annular shoulder means at an upper recessed por- tion of said outer casing for centering and supporting said inner casing fixedly within said recessed portion of said outer casing and bonnet means mounted on said outer casing engaging said outer casing in abutting relation at said recessed portion to effect said fixed positioning of said inner casing in the outer casing at said upper recessed portion.

2. In a substantially concentric duct gate valve;
the combination including two hollow casings;
one of said casings enclosing the other casing in spaced apart relation thereto;
tailpiece and seat retaining members in said inner casing telescopically mounted to permit limited axial movement therebetween;
shoulder means at an upper annular portion of said outer casing for engaging and supporting said inner casing fixedly within said outer casing at an outer enlarged portion of said inner casing and bonnet means simultaneously engaging said outer casing and said inner casing at said upper annular portions to effect fixed positioning of said inner casing in the outer casing in fluid sealing relation thereto.

3. In a substantially concentric duct gate valve;
the combination including two hollow casings;
one of said casings enclosing the other casing in spaced apart relation thereto;
a reciprocally movable closure member for said inner one of said casings;
means at an upper portion of said outer casing for supporting said inner casing fixedly within said outer casing;
bonnet means engaging said outer casing to effect said fixed positioning of said inner casing in the outer casing;
guide means interengageably positioned between said inner one of said casings and said outer casing to restrain said inner casing against substantial transverse movement relative to the outer casing while permitting limited axial movement between said inner and outer casings.

References Cited in the file of this patent
UNITED STATES PATENTS

| | | |
|---|---|---|
| 1,247,937 | Cumfer | Nov. 27, 1917 |
| 1,995,727 | Wetherbee | Mar. 26, 1935 |
| 2,649,769 | Kaiser | Aug. 25, 1953 |
| 2,705,610 | Hjulian | Apr. 5, 1955 |
| 3,057,378 | Fennema et al. | Oct. 9, 1962 |